United States Patent [19]

Kerkman et al.

[11] Patent Number: 4,706,012
[45] Date of Patent: Nov. 10, 1987

[54] FREQUENCY COMPENSATED REGULATOR

[75] Inventors: Russel J. Kerkman; Timothy M. Rowan, both of Milwaukee, Wis.

[73] Assignee: Allen-Bradley Company, Inc., Milwaukee, Wis.

[21] Appl. No.: 863,015

[22] Filed: May 14, 1986

Related U.S. Application Data

[63] Continuation-in-part of Ser. No. 735,659, May 20, 1985.

[51] Int. Cl.[4] .......................... H02P 5/40; G05F 1/44
[52] U.S. Cl. .................................... 323/280; 318/805; 364/163
[58] Field of Search ............................. 318/609, 610; 364/161–163; 323/280; 307/562; 330/85, 110

[56] References Cited

U.S. PATENT DOCUMENTS 4,282,473 8/1981 Dreiseitl et al. ..................... 318/805
4,509,003 4/1985 Ohnishi et al. ...................... 318/808

OTHER PUBLICATIONS

Rowan et al., "Synchronous Current Regulator and an Analysis of Current Regulated PWM Inverters", IEEE, 1985.

Primary Examiner—David Smith, Jr.
Attorney, Agent, or Firm—Quarles & Brady

[57] ABSTRACT

A regulator for a closed loop control system receives a sinusoidal reference input signal i* and sums it with a feedback signal i to produce an error signal. A control signal is produced by the regulator by combining signal components which include: (a) a component proportional to the error signal; (b) a componet proportional to the integral of the error signal; and (c) a component related to the frequency of the reference input signal. The latter component insures that an accurate control signal is produced by the regulator over a wide frequency range.

5 Claims, 3 Drawing Figures

४,७०६,०१२

FREQUENCY COMPENSATED REGULATOR

RELATED APPLICATION

This is a continuation-in-part of our co-pending U.S. patent application Ser. No. 735,659 filed on May 20, 1985 and entitled "Cross Coupled Current Regulator."

BACKGROUND OF THE INVENTION

The field of the invention is closed loop control systems, and particularly, control systems in which the reference input is a sinusoidal signal having a wide frequency range and in which a regulator is employed to produce a control signal by summing this reference input with a feedback signal.

There are numerous applications for closed loop control systems in which a regulator receives a reference input signal and produces a control signal for a plant. For example, in a variable speed motor drive a sinusoidal current command signal is input to a regulator and summed with a motor stator current feedback signal to produce an error, or control signal, which operates an inverter to produce the commanded motor current. The control signal produced by such a regulator typically is a proportional plus integral signal (i.e. "PI") which includes a first component that is proportional to the difference between the sinusoidal reference input and the feedback signal and a second component that is proportional to the integral of that difference.

While proportional plus integral regulators work quite satisfactorily over a narrow frequency range, they are inaccurate when operated at the upper end of a wide frequency range of reference input signals. This inaccuracy is manifested as a control signal which does not have the proper amplitude and phase at higher frequencies with the result that the controlled plant does not operate as commanded by the reference input.

SUMMARY OF THE INVENTION

The present invention relates to a regulator for a closed loop control system, and particularly, to a regulator which will operate accurately over a wide range of reference input signal frequencies. The regulator of the present invention includes means for producing an error signal by subtracting a feedback signal from the reference input signal and means for producing a control signal by adding (a) a signal component proportional to the error signal to (b) a component proportional to the integral of the error signal and to (c) a frequency-dependent component which has the same desired frequency as the reference input signal and an amplitude proportional to that frequency.

A general object of the invention is to provide a regulator which is accurate over a wide frequency range and which is economical to make. The addition of the frequency-dependent component to the proportional and integral components has been found to produce an accurate control signal over a wide range of reference signal frequencies. The improved regulator requires only a few passive components and integrated circuits in addition to those normally employed in a conventional PI regulator. The frequency-dependent component is produced by an integrator and a pair of analog multipliers which are connected in a loop to form an oscillator.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 3 is an electrical schematic diagram of the regulator shown in FIG. 2a.

DESCRIPTION OF THE PREFERRED EMBODIMENT

Figure 1:
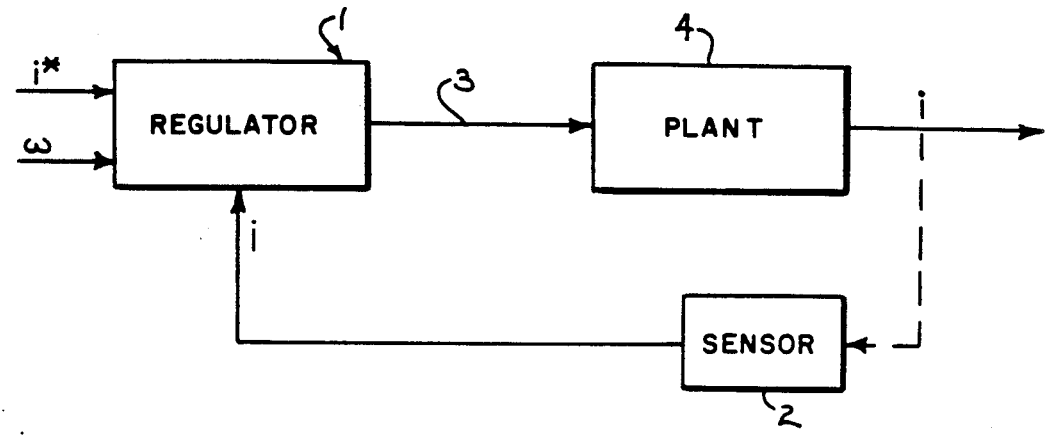
FIG. 1 is a block diagram of a closed loop control system which employs the present invention.

Referring particularly to FIG. 1, a control system receives a reference input signal $i^* = I^* \sin w^* t$, which is a sinusoidal signal having a frequency $w^*$ and an amplitude $I^*$. This reference input signal $i^*$ is applied to a regulator 1 which also receives a feedback signal $i = I \sin wt$ which is produced by a sensor 2. The regulator 1 produces a control signal at an output 3 which is applied to the input of a plant 4 that is being operated to produce a controlled output i. The sensor 2 monitors the controlled output i and the feedback signal which it produces, $i = I \sin wt$, is summed with the reference input, $i^* = I^* \sin w^* t$, to provide a closed loop control system.

For example, the plant 4 may be a voltage source inverter which supplies a sinusoidal current i to the winding of an induction motor or a synchronous motor. Such inverters are described, for example, in U.S. Pat. Nos. 4,469,997; 3,830,003 and 3,700,987. The sensor 2 may be a motor current sensor such as that dislosed in U.S. Pat. No. 4,461,987 or a more conventional current transformer which produces a signal that corresponds in amplitude, frequency and phase with the motor current i. The reference input signal $i^*$ in such a motor drive system may be varied in frequency and amplitude to control both the speed and torque of the motor in accordance with one of the well-known motor control strategies.

The regulator 1 must produce a control signal at its output 3 which will cause the controlled output i to match, or equal, the reference input signal $i^*$. There are numerous well-known regulators which purport to perform this function, but in all but the most complex circuits, these prior regulators fail to perform accurately over a wide range of frequencies.

To practice the present invention, a separate input signal w must also be applied to the regulator 1. This signal is a d.c. voltage which has a magnitude that is proportional to the frequency of the reference input $i^*$. That is, as the frequency of the reference input $i^*$ increases, the magnitude of the input signal w increases. Such a signal is commonly available in motor drive systems, for example, as a means for commanding motor speed.

Figure 2A:
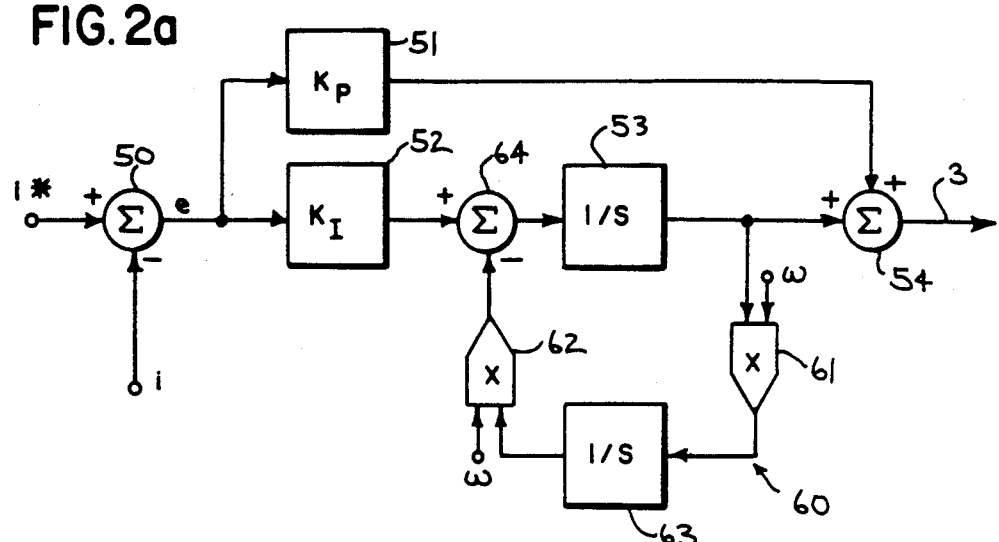
FIGS. 2a-2c are Laplace transform, block diagrams of three embodiments of the regulator of the present invention.
Figure 2B:
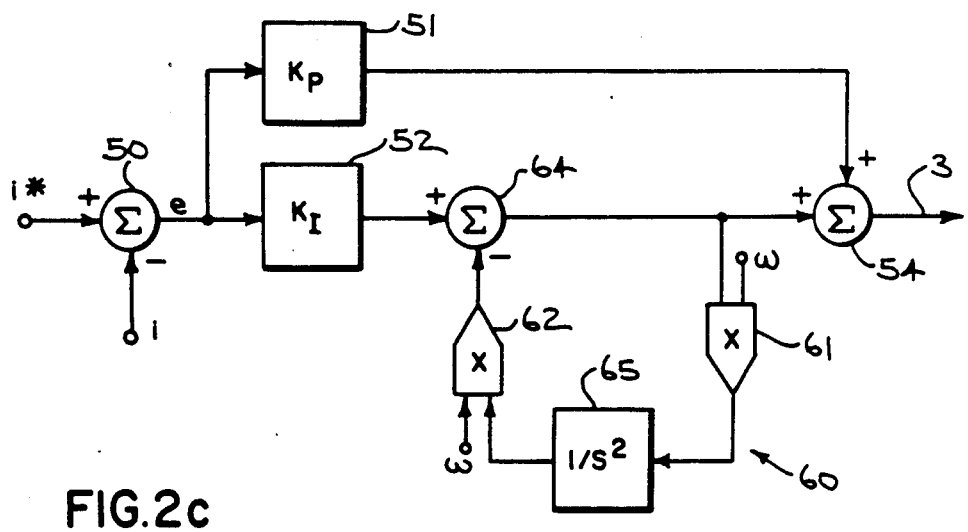
Figure 2C:
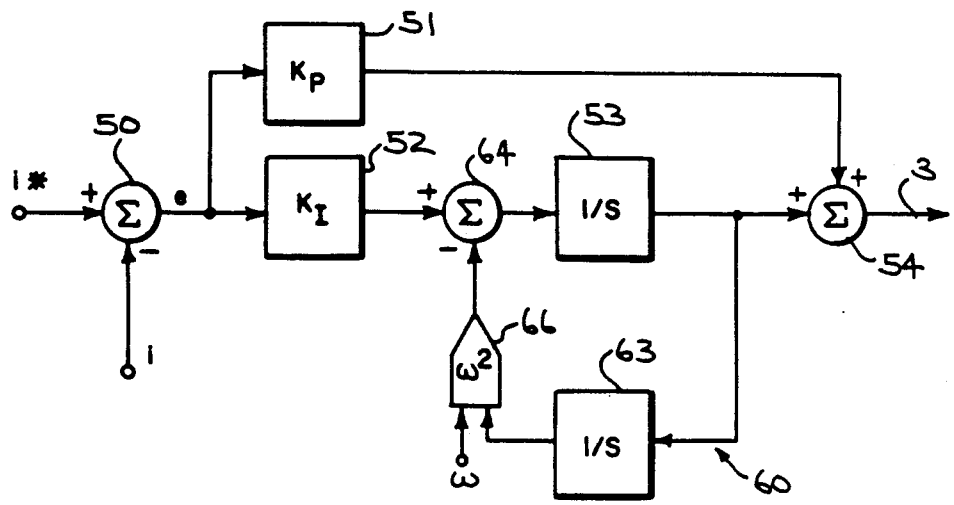

Referring to FIGS. 2a-2c, the regulator of the present invention can take a number of forms. The form illustrated in FIG. 2a includes the basic elements of a proportional-plus-integral regulator, or "PI" regulator. These include a summing point 50 at which the feedback signal i is subtracted from the reference input $i^*$ to produce an error signal e. The error signal e produces a proportional control signal component through a proportional block 51 and an integral control signal component through blocks 52 and 53. These two components are added together at summing point 54 to produce a conventional proportional-plus-integral signal at output 3.

The present invention includes an oscillator loop indicated generally at 60 which produces and applies a third component to the control signal at the regulator output 3. In FIG. 2a this loop includes the integrator block 53, a pair of multipliers 61 and 62, a second integrator block 63 and a summing point 64. The oscillator loop 60 oscillates at the frequency of the reference input signal i* and the magnitude of this component is proportional to that frequency. The magnitude is controlled by the multipliers 61 and 62 which each receive the frequency signal w as an input.

Under steady state conditions the error signal e should be zero. The control signal at the regulator output 3, however, must be a waveform which causes the plant 4 to produce an output i which corresponds to the reference input i*. This steady state control signal should have the same sinusoidal shape and frequency as the reference input signal i*, and its magnitude must be set to drive the error signal e to zero under steady state conditions. The oscillator loop 60 serves this purpose.

The alternative embodiments of the invented regulator 1 shown in FIGS. 2b and 2c operate in the same fashion and have many of the same elements which are indicated with the same reference numbers. The differences are in the construction of the oscillator loop 60, which in the embodiment of FIG. 2b includes a single function block 65 in place of the two separate integrator blocks 53 and 63. The function block 65 is comprised of two series connected integrators which may be located in the positions shown. In all three embodiments, the integrator blocks 53, 63 and 65 provide the necessary 180 degree phase shift, which when combined with the 180 degree phase shift at summing point 64, will support oscillation at all frequencies w.

The embodiment shown in FIG. 2c illustrates an oscillator loop 60 in which the separate multipliers 61 and 62 are replaced by a squaring circuit 66. The squaring circuit 66 multiplies the output of the integrator 63 by the square of the amplitude of the frequency signal w. Such a circuit may take the form, for example, of a pair of series connected analog multipliers in which the frequency signal w is applied to one input of each multiplier.

Figure 3:
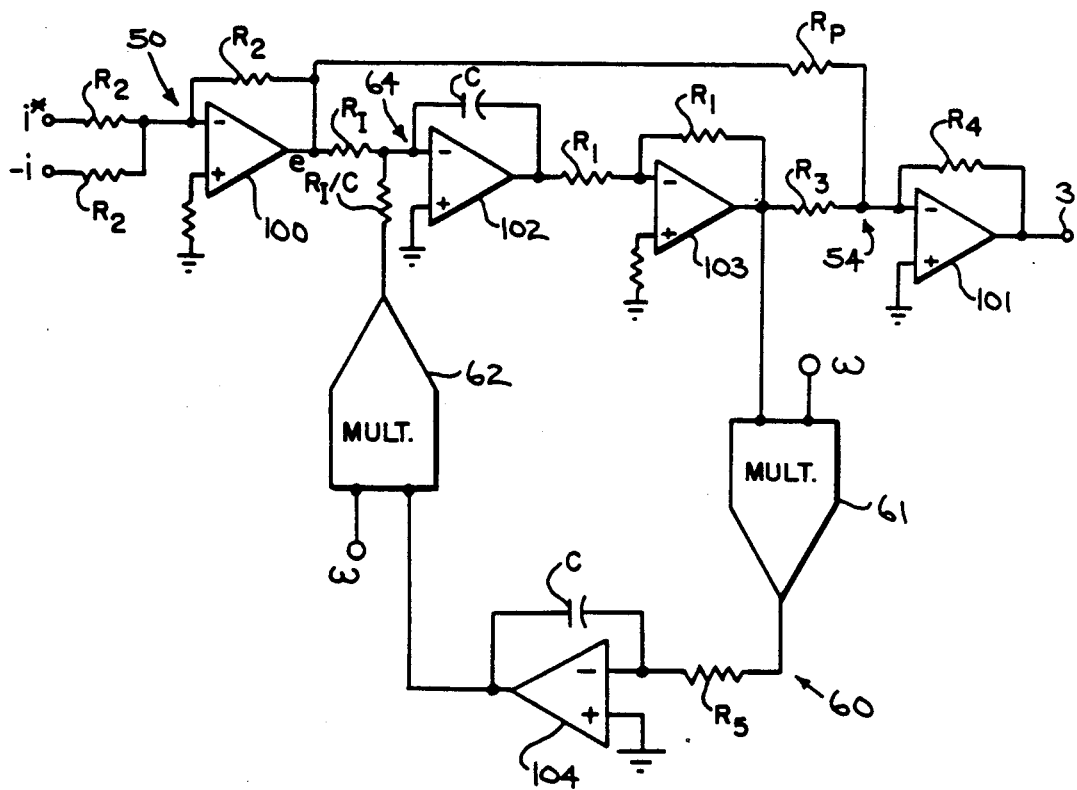

Referring particularly to FIG. 3, the preferred embodiment of the invention shown in FIG. 2a is constructed using passive components and standard, commercially available integrated circuits. The summing point 50, for example, is implemented with an operational amplifier 100 which receives the reference input signal i* and feedback signal i at its inverting input. The values of resistors $R_2$ are the same to provide unity gain at the summing point 50. Similarly, the summing point 54 at the output is implemented with an operational amplifier 101. The values of resistors $R_p$ and $R_4$ provide the gain ($K_p$) for the proportional block 51, and the values of resistors $R_3$ and $R_4$ are the same to provide unity gain for the integral component.

The integral block 53 is implemented with an operational amplifier 102 having a feedback capacitor C connected between its output and its inverting input. An input resistor $R_I$, connects to the same inverting input and its value relative to the value of capacitor C provides the integral gain ($k_I$). An inverter having unity gain is formed by an operational amplifier 103 and associated resistors $R_1$. This inverter insures that the signal produced by the integral block 53 has the same sign as the signal produced by the proportional block 51.

The inverting input to the operational amplifier $102_q$ also forms the summing point 64 which receives the signal from the multiplier 62. The multipliers 62 and 61 employ a commercially available integrated circuit manufactured by Motorola, Inc. and sold as part number MC 1595L. The output of multiplier 62 connects to the summing point 64 through a resistor having a value $R_I/C$. This provides a unity gain for the signal component produced by the oscillator loop 60. The multipliers 61 and 62 are described in more detail starting at page 6-83 in the book "Linear Integrated Circuits", published by Motorola, Inc. in 1979.

The integrator block 63 is identical to the integrator block 53. It is implemented with an operational amplifier 104 having a feedback capacitor C connected between its output and its inverting input. An input resistor $R_5$ connects to the same inverting input and its value relative to the value of capacitor C provides a unity gain.

We claim:

1. In a control system which receives a sinusoidal reference input signal (i*) and produces an output which is indicated by a sinusoidal feedback signal (i), a regulator for receiving the sinusoidal reference input signal and feedback signal and producing a control signal which comprises:

first summing means for receiving at one input said sinusoidal reference input signal (i*) and receiving at a second input said sinusoidal feedback signal (i), the first summing means being operable to produce an error signal which is indicative of the difference between the sinusoidal reference input signal and the sinusoidal feedback signal;

second summing means for receiving at one input a signal proportional to said error signal and for receiving at a second input a frequency dependent signal, the second summing means being operable to produce a summed signal which is proportional to the sum of the signals applied to its two inputs;

a first integrator having an input connected to receive the summed signal from the second summing means and being operable to produce an integrator output signal which is the integral of the summed signal applied to its input;

third summing means for receiving at one input the integrator output signal and for receiving at a second input a signal proportional to said error signal, the third summing means being operable to produce said control signal which is proportional to the sum of the signals applied to its inputs; and means for producing said frequency dependent signal which includes:

(a) a first multiplier having its output connected to the second summing means, (b) a second integrator circuit having its output connected to one input on the first multiplier, (c) a second multiplier having one input connected to the output of the first integrator and an output connected to the input of the second integrator, and (d) means for coupling to a second input on each of the multipliers a signal which is proportional in magnitude to the frequency of said sinusoidal reference input signal.

2. In a control system which receives a sinusoidal reference input signal (i*) and produces an output which is indicated by a sinusoidal feedback signal (i), a regulator for receiving the sinusoidal reference input signal and feedback signal and producing a control signal which comprises:

first summing means for receiving at one input said sinusoidal reference input signal (i*) and receiving at a second input said sinusoidal feedback signal (i), the first summing means being operable to produce an error signal which is indicative of the difference between the sinusoidal reference input signal and the sinusoidal feedback signal;

second summing means for receiving at one input a signal proportional to said error signal and for receiving at a second input a frequency dependent signal, the second summing means being operable to produce at its output a summed signal which is proportional to the sum of the signals applied to its two inputs;

an oscillator loop which connects to the second input on the second summing means and to the output of the second summing means, said oscillator loop producing said frequency dependent signal;

third summing means having one input connected to receive a signal proportional to said error signal and a second input coupled to the oscillator loop, the third summing means producing said control signal which is proportional to the sum of the signals applied to its inputs; and wherein said oscillator loop includes a pair of integrators and a multiplier connected in a series loop with said second summing means, and a signal which is related in magnitude to the frequency of said sinusoidal reference input signal is applied to an input on said multiplier.

3. The regulator as recited in claim 2 in which the pair of integrators are connected directly together.

4. The regulator as recited in claim 2 in which the oscillator loop includes two multipliers and said signal related in magnitude to the frequency of said sinusoidal reference input signal is proportional to the frequency of said sinusoidal reference input signal and is applied to an input on each of said multipliers.

5. The regulator as recited in claim 2 in which the signal applied to said multiplier is proportional to the square of the frequency of said sinusoidal reference input signal.

* * * * *